Jan. 8, 1935.  E. W. MENKE  1,987,304
METHOD OF TREATING GRAIN WITH FLUIDS
Filed July 29, 1929  3 Sheets-Sheet 1
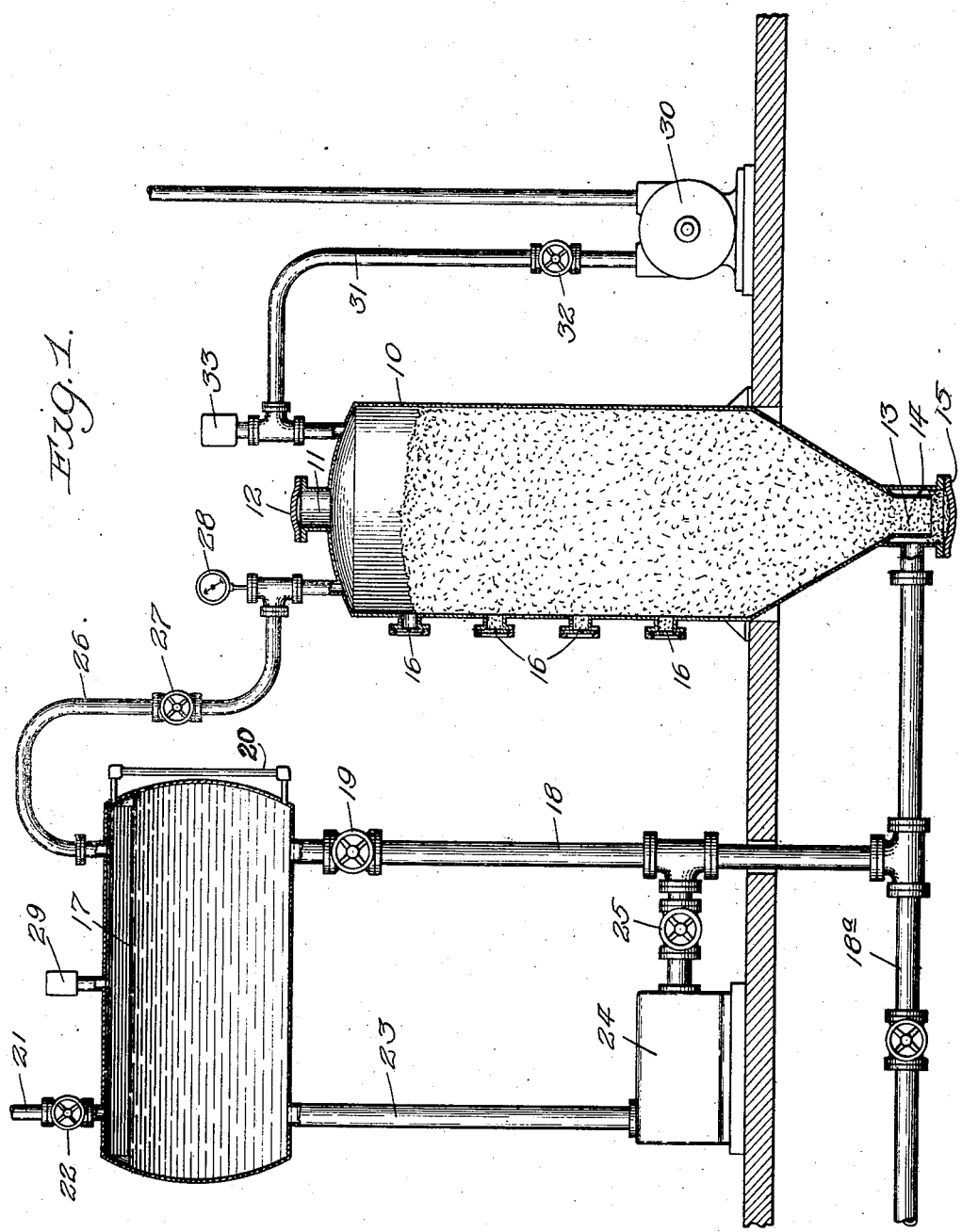

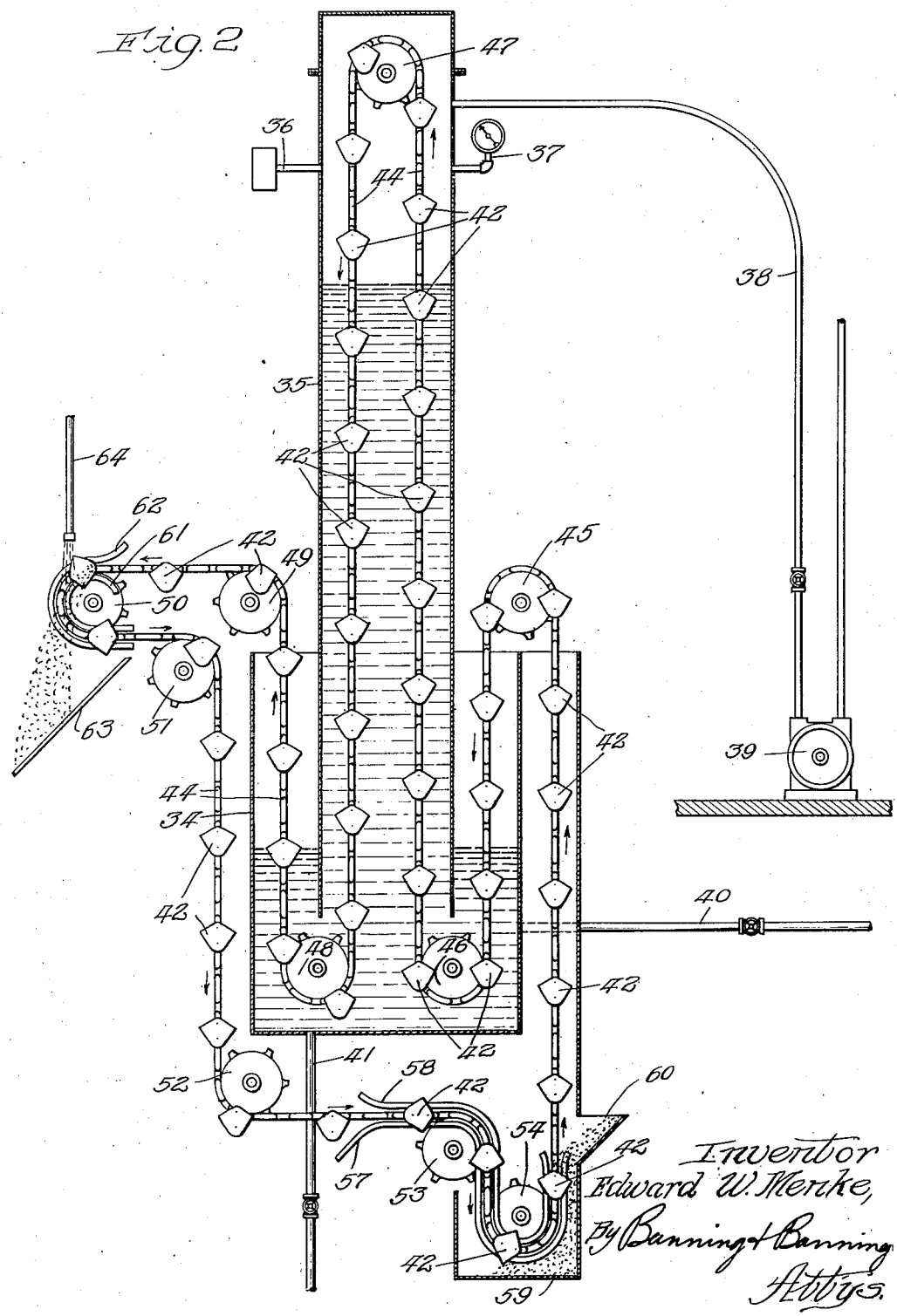

Jan. 8, 1935.  E. W. MENKE  1,987,304
METHOD OF TREATING GRAIN WITH FLUIDS
Filed July 29, 1929  3 Sheets-Sheet 3
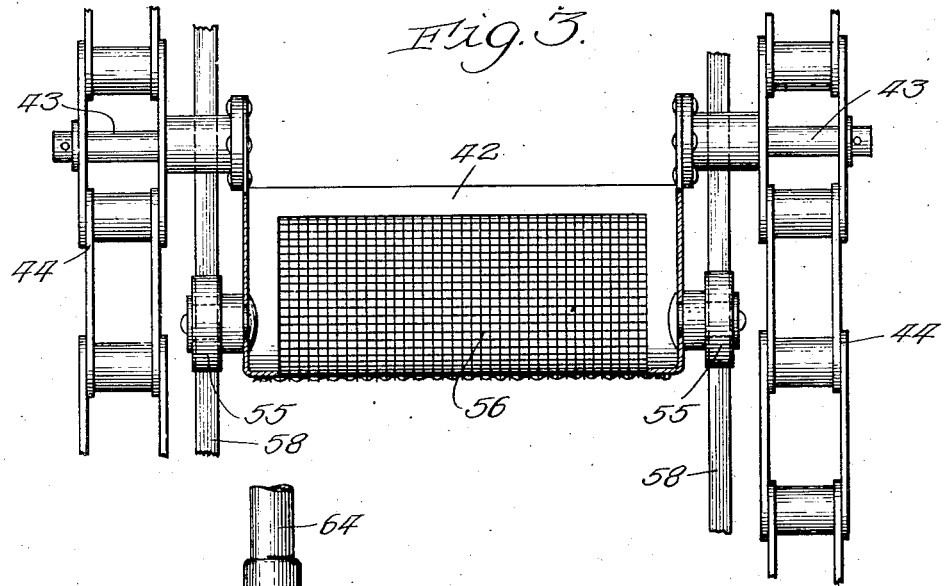
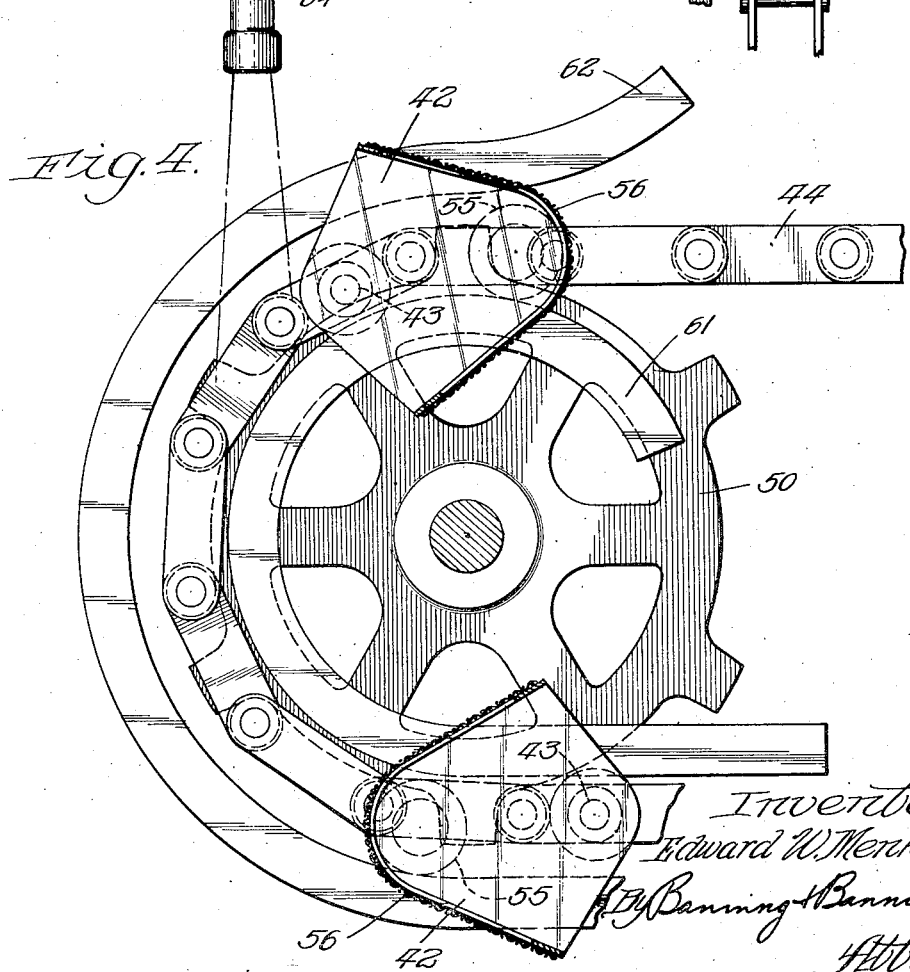

Patented Jan. 8, 1935

1,987,304

UNITED STATES PATENT OFFICE 1,987,304

METHOD OF TREATING GRAIN WITH FLUIDS

Edward W. Menke, Chicago, Ill.

Application July 29, 1929, Serial No. 381,943

3 Claims. (Cl. 83—27)

This invention relates to a method of treating grain or cereals with fluids and apparatus therefor. The invention particularly relates to tempering or conditioning of wheat and other grains or cereals before milling or processing them, by the introduction of a certain amount of water into the grains or berries. The invention further relates to the treatment of such grains or berries with other liquids and gases, such as bleaching agents or the like.

In the tempering or conditioning of such grains or berries as heretofore practiced, they have been moistened and maintained in a damp condition for a considerable time, in some cases for several days until the requisite amount of water has been absorbed. This manner of operation is objectionable on account of the long period of time necessary therefor and also because of lack of control of the amount of water absorbed.

In accordance with the present invention I subject the grain to a partial vacuum and thereby remove part of the gas contained within the grain. I then immerse the grain in water, solution or other liquid, or surround same with an atmosphere of gas which is desired to be introduced into the grains or kernels and apply pressure thereto to insure the entry of the treating fluid into the kernels. Such pressure may suitably be atmospheric pressure, although lesser pressure and superatmospheric pressure may be applied, if desired.

Among the treating fluids which may be employed I may mention water, salt solution, water containing chlorine, hypochlorites, hydrogen peroxide and other bleaching agents, chlorine, sulphur dioxide, oxides of nitrogen, nitrogen trichloride and other bleaching and treating agents.

The invention will be readily understood from the following description, taken in conjunction with the accompanying drawings, in which—

Figure 1 is a diagrammatic view partly in section of apparatus suitable for the batch treatment of grain, Fig. 2 is a similar view of an apparatus adapted to treat grain continuously, Fig. 3 is a detail illustrating the construction of a bucket and its suspension, and Fig. 4 is a detail showing the means for inverting the buckets and discharging the grain therefrom.

Referring to Fig. 1 the apparatus comprises a treatment chamber 10 which is adapted to stand vacuum and superatmospheric pressure. At its upper end the chamber 10 is provided with a charging opening 11 provided with a removable closure 12. The lower end of the chamber 10 converges to a discharge outlet 13 which is surrounded by an annular chamber 14 which extends therebelow and is closed by a suitable closure 15. The chamber 10 is provided with observation windows 16 which enables the operation to be observed from without.

The apparatus also comprises a closed tank 17 which is preferably located at a higher level so that liquid can flow therefrom by gravity into the chamber 10. The bottom of the tank 17 is connected to the annular chamber 14 by means of a pipe 18 provided with a valve 19. A valved inlet 18ª enters the pipe 18 for the purpose of supplying treating gas thereto, the pipe 18ª being connected to any suitable source of supply (not shown).

The tank 17 is preferably provided with a gage glass 20 to indicate the level of liquid therein. A liquid supply pipe 21 enters the tank 17 and is provided with a valve 22. A pipe 23 provided with a force pump 24 and a valve 25, connects the bottom of the tank 17 to the pipe 18 below the valve 19. Pipe 26 connects the top of the tank 17 to the top of the chamber 10, said pipe being provided with a valve 27 and suitably also with a pressure indicator 28. The top of the tank 17 is provided with a suitable valved outlet 29 whereby vacuum or pressure within the tank 17 may be released when desired.

The apparatus also comprises a vacuum pump 30 the suction end of which is connected by a pipe 31 to the top of the chamber 10. The pipe 31 is provided with a valve 32 and with a valved outlet 33, whereby the pressure of vacuum within the tank can be released at will.

In operating the apparatus for tempering wheat or the like by impregnating the same with water or other liquid, the wheat or other grain is placed in the chamber 10, the closure 12 is applied, the valves 19, 25 and the valve in pipe 18ª are closed. The requisite amount of water or solution is introduced into tank 17 by the pipe 21 and the valve 22 is closed. The valves 27 and 32 are open and the pump 30 is operated so as to produce a suitable degree of vacuum in the chamber 10 and in the tank 17. The result of said vacuum is to extract gas from the grains and also from the water or solution in the tank 17. When the desired vacuum is attained, as shown by the pressure indicator 28 the valve 32 is closed and the pump 30 may be stopped. The valve 19 is opened and the liquid in the tank 17 flows by gravity into the chamber 10 so that it surrounds the grains therein. By previously subjecting the water or liquid to vacuum, the entrance of same into the chamber 10 is unaccompanied by the separation of dissolved gases or foaming. No substantial penetration of water into the grains takes place since the interstices in said grains are occupied by air in a distended condition. The vacuum is now released by admitting air through either of the valved outlets 29 and 33 thus raising the pressure within the chamber 10 to atmospheric pressure. The effect of this pressure is to compress the gas in the grains and permit the immediate entry thereinto of a certain amount of water, such amount depending upon the degree of vacuum attained in the chamber 10. It will thus be seen that said amount of water can be accurately controlled in accordance with present meteorological conditions, the particular grain being treated and other variable factors.

In some cases it is preferable to apply superatmospheric pressure upon the liquid and grains in order to drive the liquid positively into the grains. Thus after evacuation and flooding, as described above, the valves 19 and 27 may be closed, the valve 25 opened and further liquid positively pumped into the chamber 10 until the desired degree of superatmospheric pressure is attained therein as shown by the indicator 28. After a suitable interval the pressure is released through the valved outlet 33.

If desired, the valve 32 may be maintained closed and the pump 30 may be omitted. In this case the liquid may be forced into the chamber 10 by means of the pump 24 so as to flood the grains therein, compress the air within said grains and force a certain amount of liquid thereinto. When the pressure is released part of said liquid will be driven out of the grains, but a part will remain therewithin. It is, however, preferred to employ vacuum since the operation is much more rapid and certain.

When the apparatus is used to treat the grain with gases, the valves 19, 25 and 27 are closed and the chamber 10 containing the grain is evacuated. When the desired grain vacuum is attained the valve 32 is closed and the valve in the pipe 18ª is opened to admit the desired gas. The gas may suitably be at atmmospheric pressure although lower and higher pressures may be employed. In the case of subatmospheric pressure the opening of the outlet 33 causes the gas to be forced into the grains. In the case of superatmospheric pressure the opening of said outlet allows excess gas to escape.

After the operation as described, the grain is removed by opening the closure 15 and superfluous moisture is removed, if necessary, by centrifuges or other suitable devices.

The apparatus illustrated in Figs. 2, 3, and 4 is suitable for the continuous treatment of grain with liquid. This apparatus comprises a well 34 which is adapted to contain a body of water or other treating liquid in which is immersed the open end of a column 35 which is closed at its upper end where it is provided with a valved outlet 36, a vacuum gage 37 and a valved pipe 38 which is connected to the suction side of a vacuum pump 39. The column 35 is relatively tall so as to accommodate a substantial column of liquid under the influence of the vacuum created in the top thereof by the pump 39, leaving an evacuated space in the upper part of said column as shown in Fig. 2. The well 34 is provided with the valved pipe 40 adapted to supply liquid thereto and a valve drain pipe 41.

Conveying means are provided whereby grain is continuously carried through the well 34, upwardly through the liquid maintained in the column 35 into the evacuated air space thereabove and downwardly through said liquid into the well 34 from which it is conveyed and discharged. Said conveying means may suitably be constituted by a series of buckets 42 pivotally suspended by means of pivots 43, upon chains 44 which pass over pairs of sprockets 45, 46, 47, 48, 49, 50, 51, 52, 53 and 54. The axis of the sprockets 45 is preferably located above the right-hand side of the well 34 as seen in Fig. 2. The axis of the sprockets 46 is preferably located below the right-hand wall of the column 35 so that the chains 44 pass downwardly into the well between said walls. The sprockets 47 are mounted within the column 35 near the top thereof so that the chains 44 pass upwardly through the column 35 from the sprockets 46 to the sprockets 47. The axis of the sprockets 48 is located below the left-hand wall of the column 35 as seen in Fig. 2 so that the chains 44 pass freely downwardly from the sprockets 47 to the sprockets 48. The axis of the sprockets 49 is located above the left-hand wall of the well 34, as seen in Fig. 2, so that the chains pass upwardly out of the well 34 between the sprockets 48 and 49. The sprockets 50 are mounted laterally with respect to the sprockets 49 so that the chains 44 move horizontally from the sprockets 49 to the sprockets 50. The chains 44 remain in contact with the sprockets 50 for 180° so that said chains become inverted while passing thereon. After becoming disengaged from the sprockets 50 the chains 44 proceed horizontally for a distance short of the well 34 where they are engaged by the sprockets 51 from which they pass vertically downwards to sprockets 52, which are located below the bottom of the well 34. From the sprockets 52 the chains 44 pass horizontally beneath the well 34 and engage the sprockets 53 from which they pass downwardly to the sprockets 54, located below the sprockets 45. The chains 44 pass upwardly from the sprockets 54 to the sprockets 45.

As shown in Fig. 3 the main body portion of the buckets 42 is located below the pivots 43 so that said buckets normally depend from said pivots so as to contain the grain, while the chains are passing over the various sprockets. At a low level thereon each bucket 42 is provided with rollers 55 which are located between the main body portion of the bucket and the chains 44. The bottom of the bucket 42 is preferably formed of wire screen or perforated metal 56 for a purpose which will hereinafter appear.

When a bucket 42 is passing from the sprockets 53 to the sprockets 54, the rollers 55 thereon go in contact with a guide 57 which is so curved that it causes said bucket to assume a horizontal position before it reaches the sprocket 53. As clearly seen in Fig. 2 the guide 57 closely approaches the level of the underside of the chain 44 and maintains such relative position as the chains pass over the sprockets 53 and 54 terminating somewhat above the top of the sprockets 54. A similar guide 58 is located on the opposite side of the chain 44 from the guide 57. As clearly seen in Fig. 3, the guides 57 and 58 are located between the chains 44 so as to engage the rollers 55. When the rollers 55 are engaged between the guides 57 and 58, the bucket 44 assumes in succession a horizontal, an inverted, a horizontal and finally a vertical position. As shown in Fig. 2, the sprockets 54 are located in a hopper 59 which is provided with an inlet 60 for grain. It will readily be understood that in passing around the sprockets 54 the buckets 42 pick up a load of grain from the hopper 59. The inlet 60 is preferably arranged so that it directs grain into said bucket as it moves upwardly in a vertical position.

As shown in Figs. 2 and 4 guides 61 and 62 similar to guides 57 and 58 are provided so as to engage with the rollers 55 while the chains 44 are passing over the sprockets 50. Said guides cause the sprockets to become inverted so that they discharge the grain contained therein onto a chute 63. Suitable nozzles 64 are provided so as to spray water upon the perforated bottoms 56 of the inverted buckets so as to completely remove grain therefrom.

In operation the vacuum pump 39 is operated to produce a vacuum of desired degree in the column 35, sufficient water being supplied to the well 34 to provide for the body of water in the column 35 and to maintain a liquid seal in the well 34. The pump 39 is operated throughout the operation so as to maintain the desired vacuum. The chains 34 are caused to move in the direction indicated by arrows in any suitable way, for example, by driving any of the sprocket wheels over which they run. Wheat or other grain to be tempered or conditioned is supplied by the inlet 60 so that it accumulates in the hopper 59. The buckets 42 passing through said hopper in the manner described acquire a load of grain therefrom. The laden buckets 42 pass upwardly to the sprockets 45 and then downwardly into the well 34 in which they become immersed. The laden buckets then pass upwardly through the liquid in the column 35 being subjected therein to gradually decreasing pressure which causes gas to be withdrawn from the grain. Eventually the buckets emerge from the liquid in the column 35 and are subjected to the full effect of the vacuum created by the pump 39. This vacuum completes the removal of air from the grain, the degree of removal depending upon the degree of the vacuum. The laden buckets now pass downwardly through the liquid in the column 35 in which the grain is subjected to increasing pressure which causes the liquid to penetrate thereinto. It will readily be understood that the amount of water which thus penetrates into the grain primarily depends upon the degree of vacuum maintained by the pump 39, and consequently is under the complete control of the operator. After the laden buckets pass around the sprockets 48 they move upwardly out of the liquid in the well 34. Superfluous liquid flows from the grain back into said well. In passing around the sprockets 50, the buckets 42 are inverted and adhering grains removed therefrom by the nozzle 64. The grain is removed by the chute 63 and surplus water is removed therefrom by means of centrifuges or other suitable mechanism (not shown).

While I have described my invention in conjunction with the details of specific apparatus, it must be understood that such details are not intended to be relative of the invention except insofar as set forth in the accompanying claims.

I claim:

1. The method of tempering grain which comprises immersing same in water, moving said grain through a barometric column of water of gradually decreasing pressure subjecting said grain to sub-atmospheric pressure, moving said grain downwardly through a barometric column of water of gradually increasing pressure, and removing the grain from the water.

2. The method of tempering grain which comprises passing the grain through water, subjecting it to a sub-atmospheric pressure after emerging from the water and while still wet, and passing it again through water.

3. The method of tempering grain which comprises immersing same in water, moving said grain through said water while gradually decreasing the pressure of the water on the grain, removing air from said grain, moving the grain through water while gradually increasing the pressure of the water on the grain, removing the grain from the water, and removing superfluous water from the grain.

EDWARD W. MENKE.